Patented Apr. 9, 1940

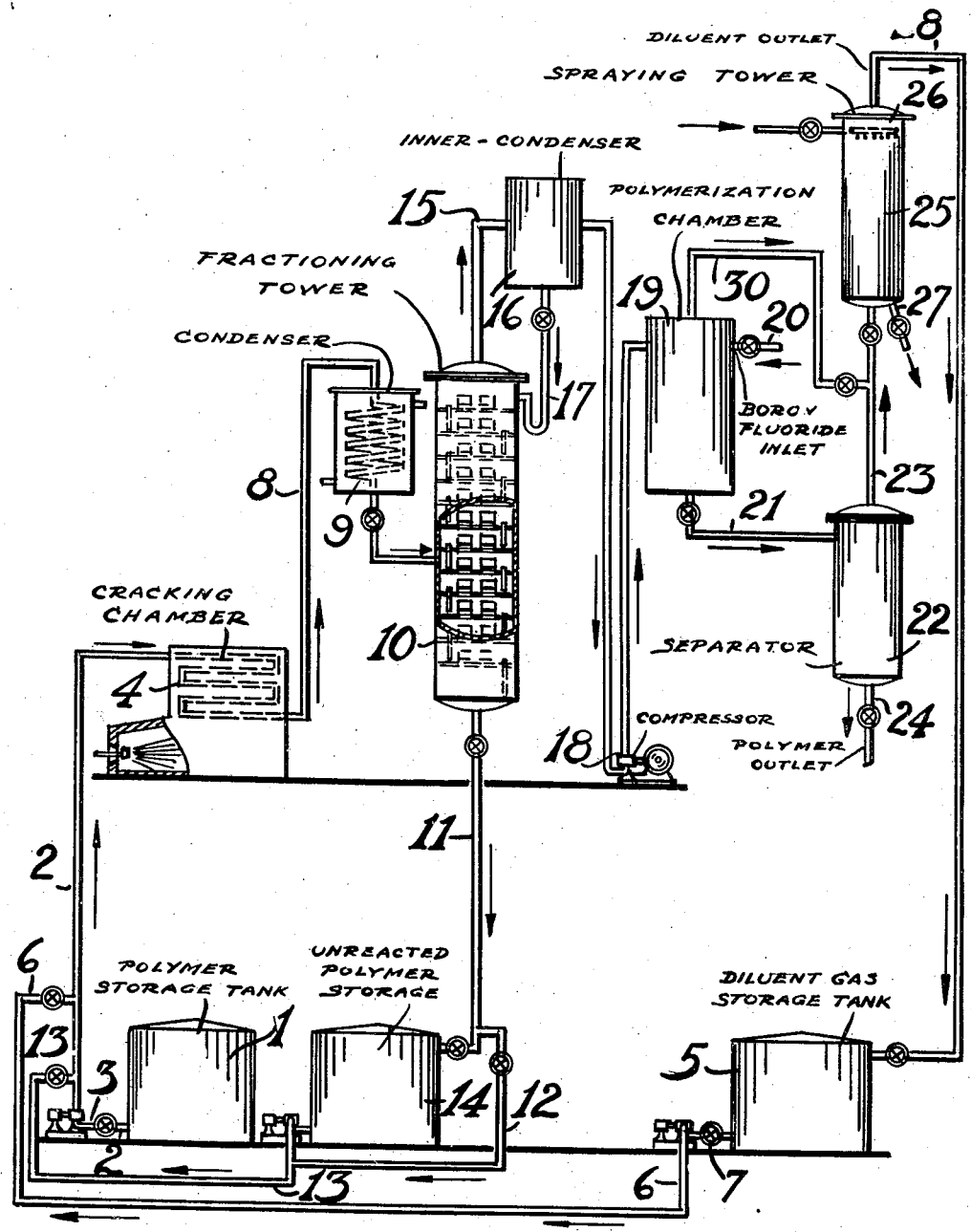

2,196,363

UNITED STATES PATENT OFFICE 2,196,363

METHOD FOR THE PRODUCTION OF ISOBUTYLENE

Anthony E. Robertson, New York, N. Y., assignor to Standard Oil Development Company, a corporation of Delaware Application November 13, 1936, Serial No. 110,601

8 Claims. (Cl. 260—683)

The present invention is directed to the conversion of diisobutylene, triisobutylene and higher polymers of butylene to isobutylene by a thermal decomposition which is presumably a depolymerization. More particularly the present invention contemplates a process in which the production of isobutylene from its polymers, particularly from its dimer and trimer, is coupled in a novel manner, with a process for the conversion of isobutylene into polymers of a molecular weight ranging upwardly from 10,000.

In the production of high molecular weight polymers of isobutylene, such as those having a molecular weight of at least 10,000, and usually of the order of 100,000 to 150,000, it is essential to use pure isobutylene as an initial material, since otherwise high molecular weight polymers are not obtainable. Since in the only available sources of isobutylene in the petroleum industry, such as refinery gases and gases obtained by cracking or dehydrogenating field butane, the isobutylene is contaminated with normal butylenes and butane, it is necessary to resort to a method for isolating the isobutylene. This may be done either by a selective conversion of the isobutylene to the corresponding alcohol, and the dehydration of the latter, or by selectively polymerizing isobutylene to dimer and trimer and decomposing these polymers. It is with the latter procedure that the present invention is concerned.

When mixed gases containing isobutylene and normal butylenes are passed through sulfuric acid of a strength ranging from 60% to 70% at about normal room temperature, the isobutylene is selectively absorbed. Upon heating the sulfuric acid containing the isobutylene to a temperature in the neighborhood of 100° C. the isobutylene is polymerized chiefly to dimer with small amounts of trimer. It is customary to subject this polymer mixture to thermal decomposition at temperatures ranging from about 550–800° F., and preferably in the presence of a catalyst, which may be any of the known cracking catalysts, including dehydrogenation and polymerization catalysts, and which is preferably a catalyst which selectively splits off $C_4$ hydrocarbons, such as Marsil clay and activated alumina.

In practice, the unconverted polymer, after separation of the isobutylene formed, is recycled. The isobutylene is subjected to polymerization by the action of boron fluoride at sub-zero temperatures.

It has now been found that the yield of isobutylene from the cracking of dimer and trimer at a given temperature is greatly increased by conducting the cracking in the presence of a large volume of inert gas. Moreover, by the use of this inert gas it is possible to obtain at a given temperature the same yield as is obtainable in the absence of the inert gas only at a much higher temperature.

The only properties required of an inert gas for use according to the present invention, is that it be incapable of reacting with the polymer or the isobutylene, stable at a temperature sufficient for decomposing the polymer, and readily separable from the isobutylene in case such separation is desired. Among the gases which may be employed for this purpose may be mentioned nitrogen, carbon dioxide, methane, ethane, ethylene and propylene.

The thermal conversion in the presence of the inert gas may be conducted at any temperature between about 350° F. and 700° F. The absolute upper limit of operating temperature is dictated by the stability of the isobutylene. It is preferable to employ catalysts. Among those suitable for the conversion may be mentioned the various types of clay, particularly Marsil clay, activated alumina, phosphoric acid, as such, or on a support such as kieselguhr or clay, titania, thoria, oxides, and sulphides of metals of Group 6 of the periodic system, alkaline earth metal oxides, rare earth oxides, and mixtures of two or more of these, such as for example, a mixture of chromium oxide and alumina.

As previously stated, isobutylene is polymerized to polymers of extremely high molecular weight, which may be either viscous oils or rubber like solids, by the action of boron fluoride at subzero temperatures, as for example at a temperature of −100° F. The temperature is usually maintained by the use of a liquefied gas. The liquefied gas and isobutylene are fed in liquid state into an insulated reaction chamber, into which boron fluoride is fed. The heat of reaction usually drives off some of the refrigerant as a gas. The polymer and remaining refrigerant is withdrawn from the reaction zone and the refrigerant is separated by vaporization.

According to the preferred embodiment of the present invention, the diluent gas employed in the cracking operation is also employed as the refrigerant in the polymerization. In this embodiment of the process the inert gas goes through a cycle of being heated at thermal conversion temperature, cooled, compressed, liquefied and vaporized. The inert gas serves the double purpose of improving the yield of isobutylene from dimer and trimer, and refrigerating the isobutylene to polymerization temperature. In practice the preferred inert gas is ethylene, since its liquefaction temperature is best suited for economical operation.

An apparatus suitable for carrying out the preferred embodiment of the present invention is illustrated diagrammatically in front elevation in the accompanying drawing, in which 1 is a storage tank for low molecular weight isobutylene polymers obtained by acid polymerization as described hereinbefore, and containing dimer and trimer and perhaps small amounts of higher polymer. This polymer mixture is fed through line 2 provided with a valve 3 to cracking chamber 4. A storage tank 5 for diluent gas is connected to line 2 by line 6, provided with valve 7. The cracking chamber 4 may be empty, or filled with a catalyst of the type mentioned above.

The product leaving the cracking chamber 4 through line 8, consists of a mixture of isobutylene, diluent gas and unreacted polymers. This mixture is passed through a condenser 9, in which dimer and higher boiling constituents are liquefied, and is then introduced into a fractionating tower 10. Dimer and higher polymers are withdrawn from the bottom of this tower through line 11, and either recycled directly by way of line 12 and 13 to cracking chamber 4, or placed in storage tank 14, from which they may be withdrawn as needed through line 13. This separation step may be facilitated by a preliminary compression of the products of the cracking step, if desired.

Isobutylene and diluent gas leave the upper part of tower through line 15 and pass through an inner-condenser 16, in which some of the isobutylene is condensed and returned by line 17 to the top plate of the fractionating tower. The remaining mixture of isobutylene and diluent gas is passed to a liquefaction apparatus represented by compressor 18, and is then introduced into polymerization chamber 19, which is heavily insulated. Boron fluoride in gaseous form is fed into chamber 19 through line 20. Some refrigerant is vaporized by the heat of reaction, and leaves the reaction chamber by line 30, carrying some boron fluoride with it.

The mixture of polymer, diluent and boron fluoride leaves the reaction chamber 19 through line 21, passes through separator 22, from which boron fluoride and diluent pass off at the top through line 23 in a gaseous state and the polymer is withdrawn through line 24. The mixture of refrigerant and boron fluoride, supplemented by that passing through line 30, is fed into the bottom of a spraying tower 25, provided with a spray nozzle 26, through which is sprayed water, dilute caustic or any other hydrolyzing agent for the separation of the boron fluoride from the diluent by hydrolysis. The hydrolized boron fluoride is drawn off from chamber 25 through line 27, and the diluent, free from boron fluoride, passes off at the top through line 28 to storage tank 5, usually after a suitable drying operation.

It is of course apparent that the present invention is not limited to a procedure in which the diluent gas in the thermal decomposition step is employed as a refrigerant in the polymerization step. In case the isobutylene is to be used for some other purpose, the diluent gas may be separated from the isobutylene, leaving the top of fractionator 10, by condensation of the isobutylene, and recycled to the cracking chamber. Again, in case the diluent gas employed in the thermal decomposition step may have such a low liquefaction temperature that its use in the polymerization step would be expensive, it may be desirable to have two separate gas cycles,—the one including the cracking chamber and the fractionating tower, and the other including the liquefaction unit and the polymerization chamber. For example, nitrogen may be used as a diluent gas in the cracking chamber, and ethylene as a refrigerant for the polymerization.

In order to determine the effect of diluent gas on the thermal conversion of diisobutylene to isobutylene, the dimer was first passed over a catalyst composed of phosphoric acid and attapulgas clay, the former constituting about 60% of the mixture, at 420° F., and with a space velocity of .013 and .0065 cubic centimeter of diisobutylene/gram of catalyst/min. The isobutylene formed constituted about 10% by weight of the feed in both cases. The reason why these two runs were made at different space velocities was to determine whether or not a reduction in space velocity would increase the yield of isobutylene. Apparently isobutylene and diisobutylene reached an equilibrium at a space velocity considerably above the higher value selected. Accordingly, a reduction in the space velocity below .0065 could not be expected to increase the yield of isobutylene.

Another run was made in which the diisobutylene was diluted with 20 mols of nitrogen per mol. The same catalyst and operating temperature were employed. The space velocity of the diisobutylene was about .0013. In this run about 75% of the diisobutylene was converted to isobutylene. It may be assumed from these facts that the use of the diluent resulted in an increased yield, not so much by reason of the reduction in the space velocity of the diisobutylene, as by influencing the equilibrium between diisobutylene and isobutylene by reducing the partial pressure of the former. In any event, the use of the diluent multiplied the yield several times.

The above specific illustration is not intended in any way to set a limit on the proportion of diluent gas to dimer to be employed. The effect of the diluent gas appears to be marked, when the ratio of diluent gas to dimer is about 3 to 1. The only other limit on this ratio is that dictated by practicability, it being of course appreciated that the capacity of the cracking unit decreases with the amount of diluent gas employed. The best results are obtainable when said ratio is between about 10 to 1 and 25 to 1.

The nature and objects of the present invention having been thus described and illustrated, what is claimed as new and useful and is desired to be secured by Letters Patent is:

1. In the conversion of a low molecular weight polymer liquid consisting essentially of diisobutylene in vapor phase to isobutylene at elevated temperature, the improvement consisting in diluting the polymer with an inert gas and conducting the process at about 350° to 700° F.

2. Process according to claim 1 conducted in the presence of a cracking catalyst.

3. Process according to claim 1 in which the inert gas used is composed of hydrocarbons having from 1 to 3 carbon atoms and not less saturated than olefines.

4. Process according to claim 1 in which the inert gas used is selected from the group consisting of ethane and ethylene.

5. Process according to claim 1 in which the ratio of diluent gas to dimer is between about 3 to 1 and 25 to 1.

6. Process according to claim 1 in which the reaction products are cooled to effect at least partial condensation and a gas containing substantially all the isobutylene formed is separated from a liquid containing substantially all the unconverted feed stock.

7. Process according to claim 1 in which the inert gas is recovered and recycled to the cracking zone.

8. In the conversion of a polymer liquid consisting essentially of diisobutylene in the vapor phase to isobutylene at elevated temperature, the improvement consisting in diluting the dimer with ethylene, using a ratio of ethylene to dimer between about 10 to 1 and 25 to 1, passing the mixture of polymer and ethylene over a cracking catalyst at about 420° F. with a space velocity of about 0.0013 cc. of dimer per gram of catalyst per minute.

ANTHONY E. ROBERTSON.